United States Patent [19]

Seeman et al.

[11] Patent Number: 4,661,933
[45] Date of Patent: Apr. 28, 1987

[54] METHOD AND APPARATUS FOR ACOUSTICALLY MEASURING THE TRANSVERSE DIMENSIONS OF A BOREHOLE

[75] Inventors: Bronislaw Seeman, Meudon; Benoit G. L. Froelich, Palaiseau, both of France

[73] Assignee: Schlumberger Technology Corporation, Houston, Tex.

[21] Appl. No.: 450,595

[22] Filed: Dec. 17, 1982

[30] Foreign Application Priority Data

Dec. 21, 1981 [FR] France .................... 81 24021

[51] Int. Cl.$^4$ .................... G01V 1/00; G01V 1/40
[52] U.S. Cl. .................... 367/27; 181/102; 181/108; 367/87; 367/151; 367/902; 367/911
[58] Field of Search .................... 367/16, 25, 27, 31, 367/912, 75, 86, 87, 137, 911, 912, 27, 33, 180, 151; 181/102, 104, 106, 108; 310/334, 335

[56] References Cited

U.S. PATENT DOCUMENTS

| | | | |
|---|---|---|---|
| 2,596,024 | 5/1952 | Goble et al. ............ | 367/86 X |
| 3,191,141 | 6/1965 | Schuster ............ | 367/911 |
| 3,542,150 | 11/1970 | Youmans ............ | 367/27 X |
| 3,590,940 | 7/1971 | Legar ............ | 181/104 X |
| 3,835,953 | 9/1974 | Summers ............ | 367/27 |
| 3,900,826 | 8/1975 | Dowling et al. ............ | 367/31 |
| 4,184,562 | 1/1980 | Bakamjian ............ | 367/86 X |
| 4,207,961 | 6/1980 | Kitsunezaki ............ | 181/120 X |
| 4,319,345 | 3/1982 | Dennis ............ | 367/25 |
| 4,383,308 | 5/1983 | Caldwell ............ | 367/31 |

FOREIGN PATENT DOCUMENTS

| | | | |
|---|---|---|---|
| 251845 | 11/1970 | U.S.S.R. ............ | 367/912 |
| 721791 | 10/1980 | U.S.S.R. ............ | 367/31 |

*Primary Examiner*—Deborah L. Kyle
*Assistant Examiner*—Brian S. Steinberger
*Attorney, Agent, or Firm*—Henry N. Garrana; Michael D. Rostoker

[57] ABSTRACT

An apparatus and method for the measuring the transverse dimensions of a hole such as in an oil well including a sonde on which an electro-acoustic transducer is mounted in an offcentered position in relation to the axis of the sonde. This transducer has two opposite active faces so as to simultaneously transmit acoustic pulses in diametrically opposite diections from the sonde. When the sonde is centered in the hole, the transducer picks up the echoes retransmitted by the wall of the hole in the two directions, at different times. A recording is made of these times and preferably also of an indication of the amplitude of each of these echoes to obtain both a diameter measurement and an indication of the condition of the hole surface. Several transducers are provided, superposed and oriented along various diameters distributed around the axis of the sonde.

3 Claims, 13 Drawing Figures

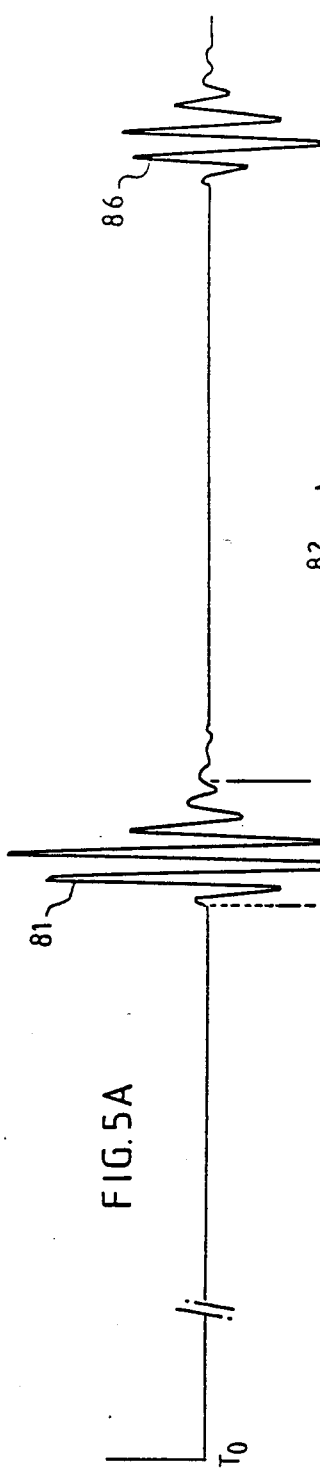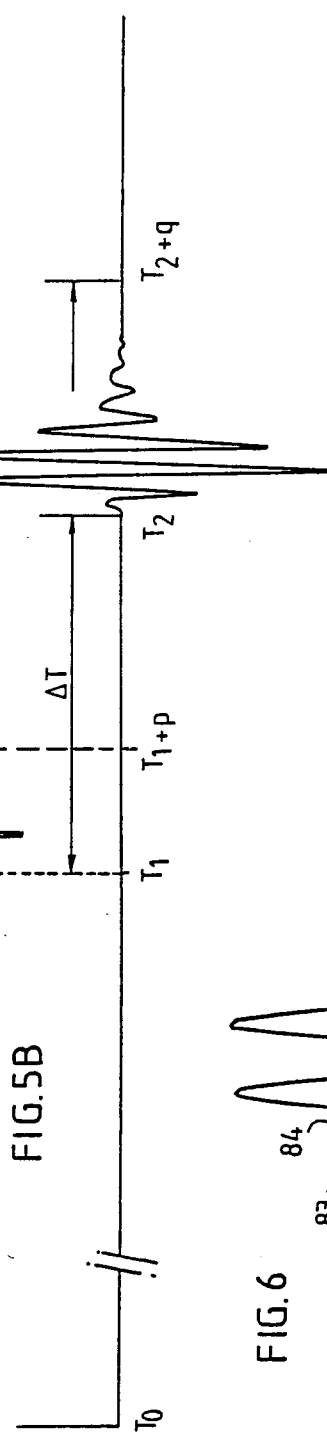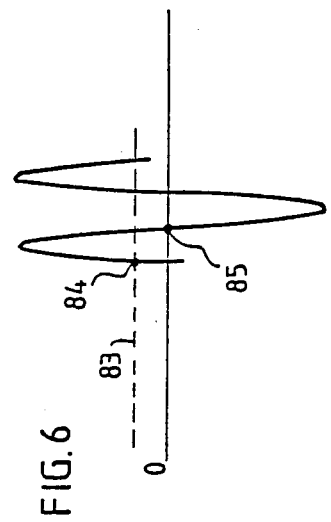

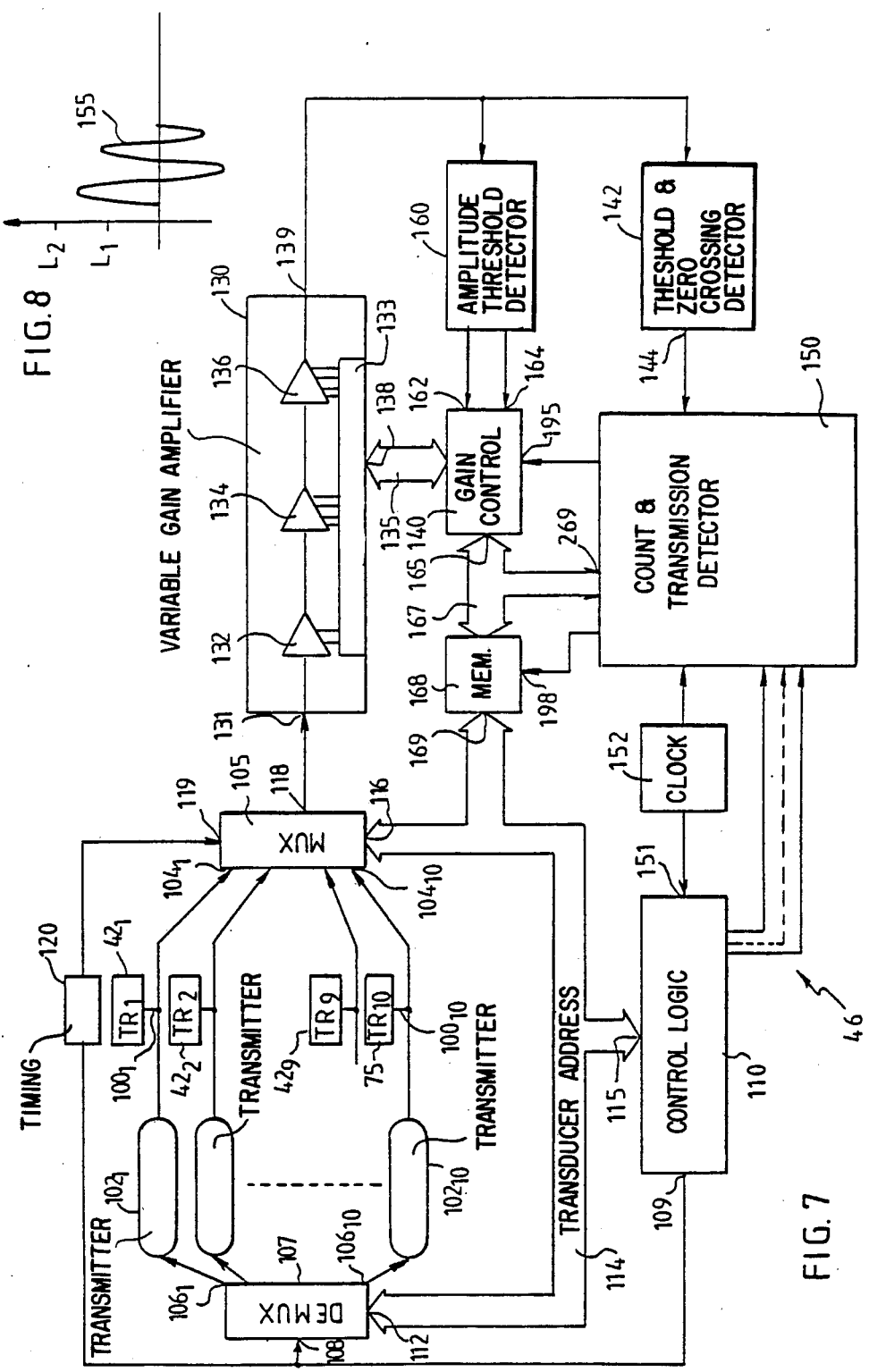

METHOD AND APPARATUS FOR ACOUSTICALLY MEASURING THE TRANSVERSE DIMENSIONS OF A BOREHOLE

BACKGROUND OF THE INVENTION

The present invention relates to the measurement of the internal dimensions of an elongated borehole, such as within an oil well.

Apparatus are known for measuring the inner diameters of cylindrical tubes or of wells bored in the ground. For example, inside calipers or sondes capable of being moved in these tubes or boreholes can be equipped with fingers adapted to spread away from the body of the caliper or sonde until they come into contact with the walls of the tubes or boreholes, the measurement of this outward spread of the fingers thus furnishes information relative to the sought diameter.

Such apparatus are also used in uncased boreholes to check the condition of their walls and notably to detect the presence of caving irregularities which can affect the logging measurements to be made within the boreholes. The condition of the internal wall of a tube, such as a steel casing supporting the walls of a well, or a production tubing designed to bring to the surface the fluids produced by a given zone of the earth formations traversed by the well can also be checked. These casing and tubing undergo numerous abrasion and corrosion phenomena with time. The monitoring of their internal dimensions makes it possible to check their degree of wear.

Mechanical caliper apparatus are however relatively complex and difficult to design, especially when one wishes to obtain a large number of measurements in holes of small diameter. Mechanical calipers also have the drawback of probably scratching the wall of the steel tubes into which they are introduced.

Acoustic-type caliper devices are known in which a transducer mounted on the sonde transmits pulses in the direction of the borehole wall. These pulses are reflected by this wall with the resulting echo being detected either by the transducer producing the pulses or by another transducer specialized in the reception of these signals. The time elapsing between the transmission of each pulse and the detection of the corresponding echo provides a measurement of the distance of the transducer from the borehole wall. By repeating similar measurements around the longitudinal axis of the sonde, for example by having a transmitting-receiving transducer rotate around this axis, it is possible to obtain plotting of the form of the hole, the accuracy of which is dependent on the number of measurements made during any given rotation cycle. By sequentially moving the sonde longitudinally after a rotation cycle, it is possible to obtain an image of the form of the hole over any chosen depth interval. Such apparatus however require the use of a drive device for rotating a relatively complex transducer. They must also operate within severe environments such as those encountered in oil well boreholes in which extremely high temperature and pressure conditions often prevail and in which any contacting media can be very abrasive.

Devices have been proposed for measuring one transverse dimension of a borehole wall in a well by means of a transducer mounted in a stationary manner on the sonde. Acoustic transducers designed for this type of application are relatively voluminous. They generally include a piezoelectric disc, one face of which is designed to transmit and receive acoustic signals, the other faces being lined with an absorbant material in order to attenuate the effect of the echoes reflected by the borehole wall in directions other than that of the transmitting face. Owing to their dimensions, it is difficult to consider the use of a large number of such transducers on the same tool, for exploring the dimensions of the borehole in several directions around the axis of the well. In addition, because of their volume, these transducers cannot be used in sondes intended to go through production tubing which is typically of a smaller diameter.

SUMMARY OF THE PRESENT INVENTION

Considering these difficulties and deficiencies, the object of the present invention is to provide an acoustic method and apparatus for measuring the transverse dimensions of a hole, notably in a well, capable of being implemented with small-diameter sondes that are capable easily of being introduced into production tubing that are within the oil wells and which lend themselves to performing a large number of measurements.

A method according to the invention is characterized in that, by means of a sonde lowered into a well, simultaneous acoustic energy pulses are transmitted in two directions from the same transducer and the echoes retransmitted to the transducer by the borehole wall in response to the pulses transmitted in these two directions are picked up successively in order to obtain a measurement of the respective distances. According to one embodiment, these two directions are opposite and aligned along a line substantially diametrical in relation to the axis of the well. The sum of the distance measurements obtained along these two directions therefore provides a measurement of a hole diameter. It is then possible to determine the diameter variations within the hole as the tool is moved longitudinally within the well. Preferably several transducers which are oriented in different directions around the longitudinal axis of the well are used to perform such measurements.

An apparatus for measuring the transverse dimensions of a borehole wall in a well according to the invention comprises a sonde capable of being moved longitudinally in the well and designed to cooperate with means for positioning this sonde in relation to the borehole wall, having at least one acoustic transducer capable of transmitting acoustic signals toward the borehole wall and picking up the signals reflected by this wall. The transducer is capable of transmitting acoustic signals in two aligned and opposite transverse directions, and of picking up the echo signals respectively reflected by the borehole wall along these two directions. The transducer is mounted on the sonde by positioning means such that the first echoes reflected by the borehole wall in response to the signals transmitted simultaneously in these two directions are received by the transducer to different times. According to a preferred embodiment, means are also provided for analyzing the amplitude of the echoes received from the borehole wall so as to provide an indication of the condition of the surface of the wall.

The electro-acoustic transducer comprises a piezoelectric material which vibrates mechanically when it is subjected to an oscillation of appropriate electric voltage. To obtain transducers which are sufficiently directive, both as regards transmission and reception, use is generally made of coatings in absorbant material which leave only one face of the piezoelectric material exposed for the transmission in the two directions of acoustic waves between the transducer and the surrounding medium. But, in general, the attenuation of the acoustic waves transmitted and received by the transducer on its face opposite its active face is particularly difficult to achieve and calls for the application on this face of relatively thick linings of absorbant material which make the transducer voluminous. According to one feature of the invention, no attempt is made to eliminate the effects of the acoustic stimulation of this opposite face and, in order to separate the echoes received by two opposite face of the transducer in response to the same excitation, provision is made so that it operates in a position which is dissymmetric in relation to the walls of the hole with which is cooperates. It is thus possible to obtain a transducer of small overall dimensions adaptable on sondes of small diameter. Moreover, when conditions allow, advantage is taken to the presence of two echoes in response to each transducer firing pulse to carry out two measurements. Thus, the apparatus according to the invention can not only be made more compact, but moreover makes it possible to achieve a high information density. Furthermore, the echoes received by the transducer are transformed into signals which are not greatly affected by the internal noise of the transducer, unlike what takes place with monodirectional transducers in which an attempt is made to attenuate, in a manner which is inevitably incomplete, the signals emitted and received by one of its faces.

According to a preferred embodiment, the transducer comprises a block of piezoelectric material having active faces on opposing sides of the block, which faces are substantially parallel to the axis of the sonde. Each face is advantageously covered with a quarter-wave plate at the excitation frequency of the transducer in order to limit the number of oscillations transmitted in response to each excitation of said piezoelectric block.

According to a preferred embodiment the sonde comprises a plurality of such bidirectional transducers whose orientations are distributed around the sonde as to allow the measurement of multiple radially transverse dimensions. These transducers can be superposed on each other along the sonde. The sonde can moreover be equipped with a reference transducer, identical in its composition to the measurement transducers, but which is mounted so as to transmit acoustic pulses in two opposite directions toward two respective reflectors placed at different distances from this transducer. The space between the transducer and each of the reflectors is in contact with the medium surrounding the sonde. Thus, the measurement of the time intervals between the transmission of a pulse by this reference transducer and the reception of the respective echoes provides a precise measurement of the propagation velocity of the acoustic waves in the medium in which the sonde is immersed. It can also provide a measurement of the attenuation constant of the acoustic waves propagating in this medium.

In the case of small-diameter tubes such as production tubing, in which it is possible to detect only the first echo received by the transducer and thus obtain a radius measurement, it is advantageous to use an odd number of transducers distributed regularly over the periphery of the sonde.

The following explanations and description are of an illustrative nature and are given with reference to the appended drawings in which:

FIGS. 5a and 5b represent diagrams of the signals used in the operation of the invention;

FIG. 6 is a signal diagram illustrating a detail of the explanations provided;

FIG. 7 is a functional diagram of the measurement circuits associated with the sonde;

FIG. 8 is a diagram illustrating the analysis of the amplitude of the echo signals received;

DETAILED DESCRIPTION OF THE PREFERRED EMBODIMENTS

Figure 1:
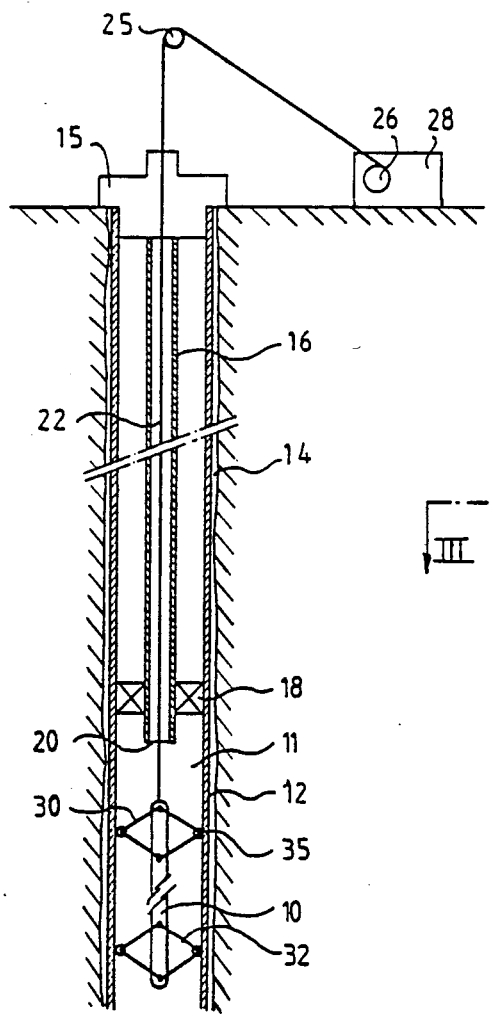
FIG. 1 represents a sonde according to the invention in operation in an oil well.

In FIG. 1, a sonde 10 is lowered into a well 11 whose walls are lined with a steel casing 12 over its entire depth. This casing 12 is connected to the formation defining the well by an impervious cement filling 14.

At its upper part, the well 11 is equipped with a well head 15 having shutoff valves (not shown) connected to a production tubing 16 having a diameter substantially smaller than that of the well 11. The tubing 16 goes down into the well to a pre-determined depth. The annular interval between the lower end 20 of the tubing 16 and the casing 12 is closed off by a plug or packer 18. With this construction it is possible to convey to the surface the fluids produced by the oil-bearing formations traversed by the well below the packer 18.

As illustrated, the sonde 10 is suspended in the well by a cable 22 which passes through the tubing and the well head 15. This cable is run back to the surface, passed around a pulley 25, connected to a winch 26 of a control unit 28 which is used for controlling the measurements operation. The cable 22 is used for both mechanical suspension of the sonde 10 and for the electrical transmission of signals between the sonde 10 and the control unit 28.

In one embodiment, the outer diameter of the sonde 10 is about 43 mm, a value which allows its passage through tubing of small inner diameter. This sonde 10 is equipped, in the vicinity of its upper and lower ends, with centralizing devices 30 and 32 that make is possible to keep the longitudinal axis of the sonde 10 substantially in coincidence with the longitudinal axis of the cased well 11 during the longitudinal movements of the sonde 10 within the well. The centralizers 30 and 32 are equipped with arms having rollers 35 distally mounted thereon which rollers are made of a rubbery material that can minimize the scratching of the casing 12 or the tubing 16 when the sonde 10 is moved vertically in the well 11. These arms are loaded by springs (not shown) which tend to spread them away from the sonde and to apply the rollers 35 against he walls of the well 11. The stiffness of these springs and the number of arms are determined in order to maintain any offcentering of the arms in relation to the centerline of the well within specified tolerance limits, for example when the well is inclined with respect to the vertical. The number of arms usually varies from four to six depending on specific utilization conditions.

Figure 2:
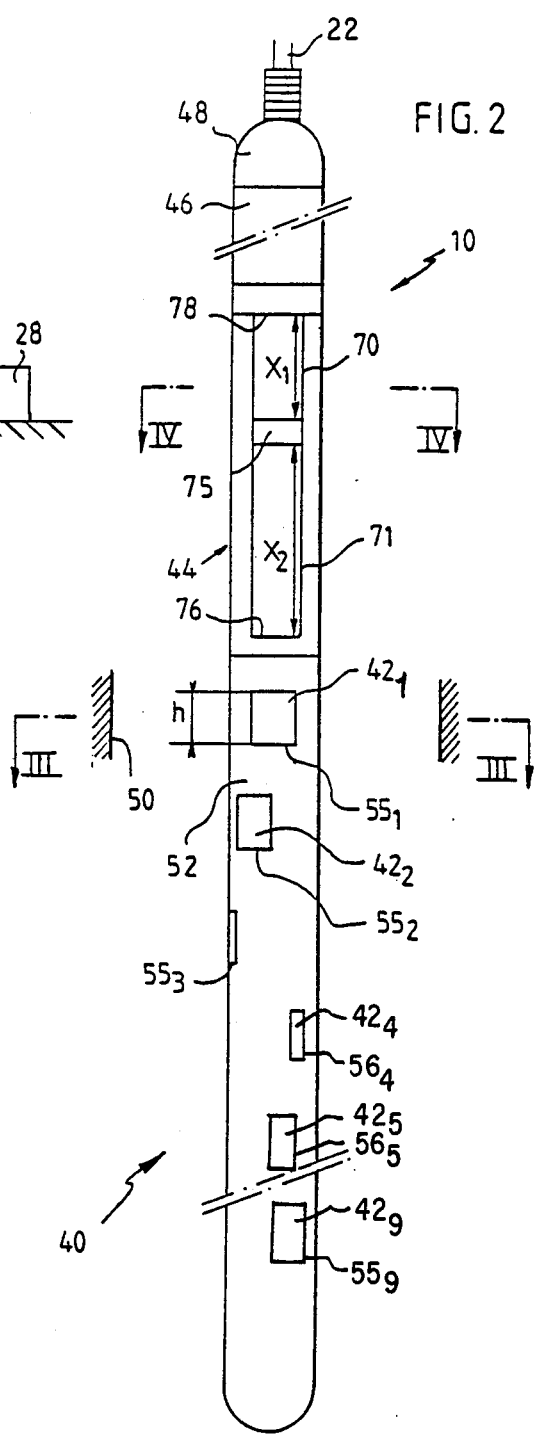
FIG. 2 is an elevation view of the tool of FIG. 1.

As shown in FIG. 2, the sonde 10 further comprises, separately or in combination with other logging devices in the well, an acoustic caliper module 40 which includes nine electro-acoustic transducers $42_1$ to $42_9$ superposed in a configuration which will be explained in greater detailed below.

Connected to the caliper module 40 is a reference module 44 designed to carry out measurements of the speed of the acoustic waves in the well 11. The sonde 10 terminates at its upper end with a signal-preprocessing electronic cartridge 46 that is fixed directly to a head 48 for connecting the sonde 10 to the cable 16.

Figure 3:
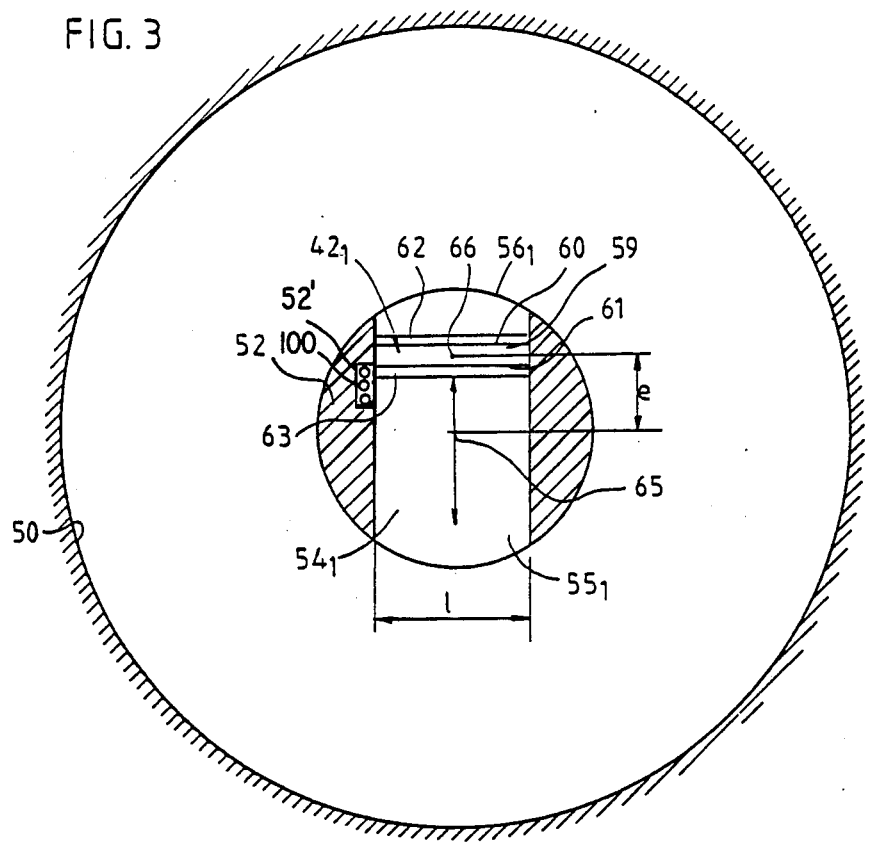
FIG. 3 is a sectional view of the tool along the line III—III of FIG. 2.

FIG. 3 represents a cross-section at the level of the transducer $42_1$ of the sonde 10. For simplicity the sonde 10 is assumed to be centered in relation to the internal wall 50 of the casing 12. The sonde body 52 includes a through passage $54_1$ which is rectangular in longitudinal section, i.e. higher than it is wide. The dimensions of the passage $54_1$ are about 25 millimeters in height (see dimension h in FIG. 2) and 15 millimeters in width (dimension l in FIG. 3). The passage $54_1$ terminates in two diametrically opposite openings $55_1$ and $56_1$ in the outer wall of the tool body 52.

Within the passage $54_1$ is mounted the piezoelectric transducer $42_1$ which includes essentially a rectangular ceramic block 59 (FIG. 3) with a height of h and a width of l. The block 59 is lined on each of its faces 60 and 61 with a metallic coating. The coatings are connected to conductors (not shown) for the piezoelectric excitation of this block by the application of voltage pulses. The metallized faces 60 and 61 are lined respectively with suitable coatings 62 and 63 whose thickness is determined so as to correspond to one-fourth of the propagation wavelength in this material of the acoustic signals produced by the piezoelectric ceramic block 59 when it is excited for example by a 500-kHz electric voltage signal. The coatings 62 and 63 play the role of quarter-wave plates having the effect of producing a relatively sharp cutoff of each burst of acoustic oscillations transmitted from the faces 60 and 61 of the block 59 under the action of a brief block excitation signal at the frequency indicated for sending a corresponding energy pulse into the medium surrounding the sonde body 52 and in which are immersed the outer faces of the transducer $42_1$. Coatings 62 and 63 can be formulated with various materials such as a high performance thermo plastic (e.g. poly ether ether ketone) or an epoxy resin.

The plane of the block 59 is parallel to the longitudinal axis 65 of the sonde body 52 and perpendicular to the direction of the passage $54_1$. The transducer $42_1$, whose total thickness is about 6 millimeters, is mounted in a position which is offcentered in relation to the axis 65, by distance e which is about 12.5 millimeters.

The transducers $42_1$ is symmetric from the geometrical and electrical standpoints. The value of the offcentering e is determined such that the echoes received by the transducer in response to a pulse transmitted in the two opposite directions in which the transducer is facing are received at moments of time sufficiently far appart so as to be detectable with accuracy by the transducer and the processing electronics to which it is connected.

The transducers $42_1$ to $42_9$ (FIG. 2) are mounted eccentrically in nine passages $54_1$ to $54_9$ which are all shaped identically but the orientations of which are offset angularly around the longitudinal axis of the sonde by 40 degrees in relation to each other. Each of these transducers makes it possible, by detecting the different return times of the two echoes observed in response to each pulse transmitted, to obtain measurements of the transverse dimensions of the well on nine diameters spaced angularly by 40 degrees. As represented in FIG. 2, the openings $55_1$, $55_2$, and $55_3$ corresponding to the passages $54_1$ to $54_9$ are about 50 millimeters from each other in the axial direction, the total height of the acoustic caliper module 40 thus being about 45 centimeters.

Figure 4:
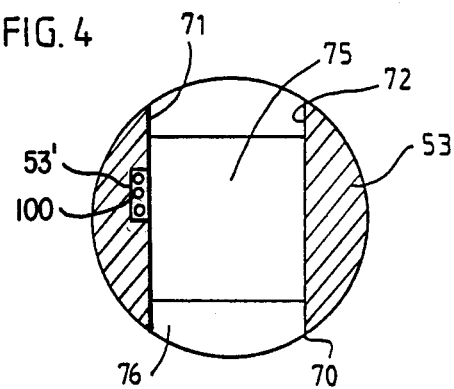
FIG. 4 is a sectional view along the line IV—IV of FIG. 2.

The reference module 44 includes an axial slot 70 provided in the body 53 of the module (FIG. 4) and defined by respective longitudinal plane walls 71 and 72 on each side of the sonde axis. A symmetric transducer 75 identical in its make-up to that of each of the transducers $42_{1-9}$ is mounted between the walls 71 and 72 so that its active faces are perpendicular to the axis of the sonde and located at unequal distances, respectively $X_2$ and $X_1$, from the longitudinal end walls 76 and 78 of the slot 70. The measurement of this time interval makes it possible to precisely determine the velocity of the acoustic waves in the fluid filling the well and in which the transducer 75 and the reflectors 76 and 78 in the longitudinal slot 70 are immersed. The attenuation constant of this fluid can also be determined. In this example, the distances $X_1$ and $X_2$ are chosen equal to 45 mm and 75 mm, respectively corresponding to round-trip transit times of 60 $\mu$s and 100 $\mu$s respectively in a fluid such as water. These values will constitute the typical values for the other transducers $42_{1-9}$.

The total height of the reference module 44 is about 15 centimeters. The total length of the assembly made up of the modules 40 and 44 is thus about 60 centimeters. The resulting tool therefore not only has small transverse dimensions but also a relatively reduced length.

In the module bodies 52 and 53 the passages 54 and the longitudinal slot 70 are traversed by channels in which are placed the conductors connecting the transducers $42_1$ to $42_9$ and 75 to the electronic cartridge 46.

The general operation is the following: The transducers $42_1$ to $42_9$ are supplied successively by excitation pulses. Clock pulses transmitted at a frequency of 10 MHz are counted from the instant $T_0$ of the excitation pulse of each transducer 42 (FIGS. 5a and 5b). Each transducer 42 transmits two symmetric pulses which propagate in opposite directions toward the walls of the casing 50. After reflection, the resulting echo signals are detected by the transducer at respective times $T_1$ and $T_2$ which correspond to a time interval $\Delta T$ approximately equal to four times the time taken by the acoustic waves transmitted to cover the distance e equal to the offcentering of the transducers. FIG. 5a shows the first echo 81 coming from the nearest well wall portion 50 and received by the transducer as of the time $T_0$. FIG. 5b shows the first echo 82 coming from the farthest portion of this wall. Each of the detected signals 81, 82 is made up of a succession of very rapid oscillations of short but not negligible duration and whose amplitude, after having undergone a sudden increase, decreases owing to the effect of the respective quarter-wave plate.

The detection of the time $T_1$ and $T_2$ is carried out as illustrated in FIG. 6 by detecting the first crossing of a threshold, symbolized by the broken line 83, by each oscillating signal 81 and 82 coming from the transducer (point 84 of the waveform of this signal) as received by the electronics 46 and by noting the number of pulses counted upon the following zero-crossing of the waveform as illustrated by point 85 of FIG. 6. In addition, the amplitude of the echoes is measured to obtain an indication of the surface condition of the wall reflecting the signal. This indication is furnished by the level of gain necessary for maintaining the signal 81 or 82 after amplification within a given amplitude range. In particular, the echo received from the farthest wall of the well is generally amplified to a greater extent since the corresponding acoustic signal has travelled a longer distance and has undergone greater attenuation.

These functions are implemented by a electronic circuit 6 (FIG. 7) in which the conductors $100_1$ to $100_{10}$ coming from the nine transducers $42_1$ and $42_9$ and from the transducer 75 are each connected, on the one hand, to the output of a corresponding transmitter $102_1$ to $102_{10}$ and, on the other hand, to a corresponding input $104^1$ to $104_{10}$ of a multiplexer 105.

The transmitters $102_1$ to $102_{10}$ are controlled by the corresponding outputs $106_1$ to $106_{10}$ of a demultiplexer 107 wose control input 108 is capable of receiving pulses from the firing control output 109 of a control logic 110. The demultiplexer 107 is adapted to carry out the distribution of the firing pulse to the transmitters $102_1$ to $102_{10}$ according to the information transmitted to its address input 112 by an addressing bus 114 connected to an addressing port 115 of the control logic 110. The port 115 is also connected to an addressing input 116 of the multiplexer 105 so as to control the transmission, on the output 118 of this multiplexer, of the signals present on whichever of its inputs $104_1$ to $104_{10}$ is designated by the addressing signal. The control logic 110 is a sequencer wired to cyclically address the transducers (schematically designed $TR_1$ to $TR_{10}$ in FIG. 7) by means of the demultiplexer 107 and the multiplexer 105.

After each transducer firing pulse, the multiplexer 105 and the demultiplexer 107 are positioned by an identical address signal respectively on the input $104_i$ and the output $106_i$ corresponding to the same transducer $42_i$. The firing pulse is an enabling logic signal with a duration of about 1 microsecond that is transmitted every millisecond. This pulse is transmitted by the demultiplexer 107 to excite one of the transmitters $102_i$. Each transmitter includes a pulsing circuit operating at a frequency of 500 kHz so as to deliver, in response to the control pulse, a bipolar electric voltage pulse with a duration of 2 microseconds and of about 400 volts peak-to-peak. This voltage excites the corresponding piezoelectric transducer $TR_i$ which then transmits an acoustic energy pulse into the medium surround the sonde 10. The output 109 of the control logic 110 is also connected to an inhibition input 119 of the multiplexer 105 through a timing circuit 120. Thus, no signal appears on the output 118 of this multiplexer throughout the duration of the firing pulse and during an additional period lasting a few microseconds following the first period, in order to prevent the reception of noises related to transmission. As of the end of this inhibition period, the output 118 of the multiplexer 105 listens for signals transmitted by the transducer $TR_i$ on the corresponding input $104_i$. The output 118 of the multiplexer 105 is connected to the input of a variable-gain amplifier 130 which includes three series-connected amplification stages whose gain is adjustable by discrete values. The first stage 132 includes, for example, two gain values, 0 and 30 dB, respectively. The second stage 134 is adjustable with five gain values, 0, 6, 12, 18 and 24 dB, respectively. The gain of the third stage 136 is adjustable in steps of 1.5 dB between 0 and 4.5 dB. Thus, the gain of the amplifier 130 is adjustable in steps of 1.5 dB over a gain range extending from 0 to 58.5 dB. These gain values are controlled by the outputs of a decoder 133 which decodes a digital signal set on a multi-bit input 138 of the amplifier 130, through a connection 135 coming from a gain control circuit 140 whose function is explained below.

The output 139 of the amplifier 130 is connected to the input of a threshold and zero-crossing detector 142 which includes two comparators triggered successively by the crossing of the threshold 83 and zero of FIG. 6. The signal appearing on the outut 144 of the detector at the zero crossing point 85 of the output signal of the amplifier 130 is processed by a detection, counting and transmission circuit 150 which will be described below and which receives the pulses from a clock 152 at 10 MHz which is also connected to a timing input 151 of the control logic 110.

The output 139 of the amplifier 130 is also connected to the input of an amplitude change detection circuit 160 capable of delivering a signal on an input 162 of the circuit 140 when the amplitude of the received echo signal has exceeded a level L2 (FIG. 8), and a signal on an input 164 of the gain control circuit 140 when the received signal 155 has not exceeded a lower level L1 (FIG. 8), the ratio between the two levels L2 and L1 being 1.5 dB.

The circuit 140 includes a register (not shown) connected to a four-bit input 165 of the circuit 140 which in turn is connected to a gain bus 167. The latter makes it possible to transfer into this register, from a memory during the preceding operating cycle of the transducer $TR_i$ in a position whose address corresponds to this transducer. Upon the firing of the transducer $TR_i$, the control logic triggers, by applying the output signal 109 on an input 271 of the circuit 140, the transfer of a gain value $G_1$ stored in memory for this transducer into the gain register of the circuit 140. The multibit output of the register sets the gain of the amplifier 130 through the connection 135. With the end of an echo signal detected at the output of the latter, as will be explained below, the value contained in the register is incremented in response to a signal on the input 164 or decremented in response to a signal on the input 162 to modify the gain of the amplifier 130 in the corresponding direction, for example by means of an adder, or by loading the value of the gain into an up-down counter whose up-down counting inputs are placed under the control of the inputs 162 and 164. The new numerical value of the gain $G_1$ stored in memory 168 by the bus 167 is transmitted by the latter to the input 269 of the detection, counting and transmission circuit 150. Thus, the gain of the amplifier 130 is set for each fired transducer according to the value it had during the preceding firing of this transducer.

The same operation for setting a gain stored in memory is undertaken at the end of the first echo detected by the transducer $TR_i$ awaiting the next echo. Another gain value $G_2$ determined after the reception of this echo is stored in memory 168 in a second position assigned to the transducer $TR_i$.

Figure 9:
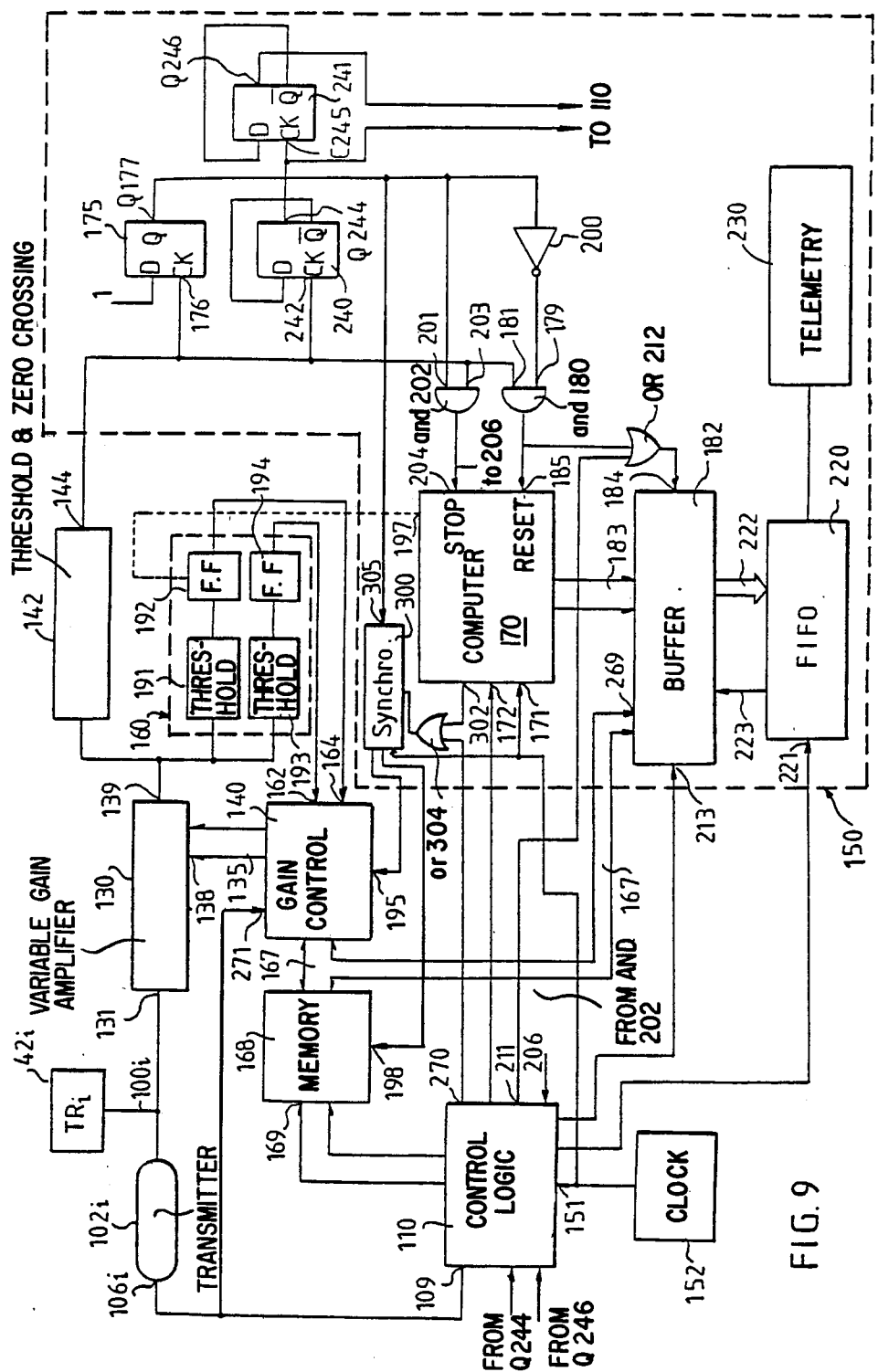
FIG. 9 is a more detailed circuit diagram of certain parts of the diagram of FIG. 7.

A more detailed description will now be given of the detection, counting and transmission circuit 150 during the firing of a transducer $TR_i$ by the control circuit 110 (See FIG. 9 in which the multiplexing and demultiplexing circuits 105 and 107 respectively have been omitted). At the time $T_0$ corresponding to the firing of the transducer $TR_i$, a counter 170 receiving pulses from the clock 152 on a count input 171 is triggered by a signal coming from the control logic 110 on its input 172. When a first echo 81 (FIG. 5a) is received by the transducer $TR_i$ and transmitted by the amplifier 130, the threshold the zero-crossing detection circuit 142 produces, on its output 144, a signal which causes the changeover of a D-type flip-flop 175, to the input 176 of which it is connected, so that the output Q 177 of this flip-flop changes over from 0 to 1 and applies, through an inverter 300, a blocking signal on an input 179 of an AND gate 180 whose other input 181 receives directly the pulse from the output 144. This produces, just before the blocking of the AND gate 180, a brief signal at the output of the latter which triggers the instantaneous reading of the contents of the counter 170 in a buffer register 182 by a multibit link 183, enabling the read input 184 of this register. At the same time, the brief signal coming from the AND gate 180 is applied to the reset input 185 of the counter 170 which, still supplied by the pulses from the clock 152, begins counting again from zero.

The echo 81, amplified at the output of the amplifier 130 with the gain $G_1$ previously stored in memory 168 for the first echo received by the transducer $TR_i$ during its preceding firing, as explained earlier, is analyzed by the amplitude change detector 160. This device comprises a first threshold detector or level comparator L1, 191, which triggers a flip-flop 192 if the threshold L1 is crossed and a second comparator 193 which triggers a flip-flop 194 when the threshold L2 is crossed. The inverting output of the flip-flop 192 is connected to the input 164 and the direct output of the flip-flop 191 is connected to the input 162 of the gain control circuit 140. After a time $T_1+p$ (FIGS. 5a and 5b), corresponding to a predetermined count level of the counter 170 after its resetting by the AND gate 180, the gain control circuit 140 increments or decrements the gain, or leaves it unchanged, depending on the signals present on its inputs 162 and 164 under the control of a signal coming from a decoding output 302 of the counter and applied, through an OR gate 304 and a synchronization circuit 300, to an input 195 of the gain control circuit 140. The time p is chosen so that this gain value modification takes place as soon as the maximum deviations of the first echo are passed. The numerical value of the gain $G_1$ thus obtained is placed in a memory position 168 corresponding to the first pulse detected by the transducer $TR_i$. The gain value $G_1$ is also transmitted into a position of the buffer register 182 along with the count value corresponding to the time $T_1$ by the gain value bus 167 connected to an input 269 of this register. As soon as the digital word corresponding to the time $T_1$ and to the gain $G_1$ is transferred to the buffer memory 182, it is loaded into a first in-first out register 220 through a multibit link 222. This register is connected to the telemetering circuit 230 for the word-by-word transmission of the measurements carried out following the firing of each transducer $TR_1$ and $TR_{10}$. The telemetering circuit 230 transmits these measurements along the cable to the surface.

The memory 168 has two storage positions for each transducer $TR_1$, one for storing the gain value $G_1$ corresponding to the first echo received following a firing and the other for the value $G_2$ of the next echo. In addition to the four-bit addressing of its input 169, this memory includes an input 198 controlled in response to the outut Q 177 of the flip-flop 175 through the synchronization circuit 305. The signal present on this input indicates, depending on whether its logic level is 1 or 0, if the first pulse has been received or not. Consequently, the input 198 plays the role of a fifth addressing bit for the positions of the memory 168 designated for each transducer by the address bus 169. This additional bit designates the positions corresponding to the gains $G_1$ and $G_2$ according to the detection of the first pulse by the flip-flop 175.

The synchronization circuit 300 triggers the readjustment operation for the gain $G_1$ by sending a signal to the input 195 of the gain control circuit 140 as soon as the output 302 of the counter 170 has indicated the end of a period p after the first resetting of the counter and then controls the transfer of the new value $G_1$ to the corresponding memory position for the first pulse received by the transducer $TR_i$.

At the end of a short time interval following this storage in memory, the circuit 300 applies the logic level 1 to the input 198 of the memory in response to the output signal Q 177 present on its input 305. It then brings about the extraction of the value $G_2$ of the gain previously stored in memory for the second echo 82 which is transferred by the bus 167 to the register of the circuit 140. Thus, after a short time interval following $T_1K+p$, the gain of the amplifier 130 is set at a suitable value for the reception of the next echo 82 (FIG. 5b). This value is normally higher owing to the greater attenuation undergone by the acoustic pulse during its round trip to the wall portion farthest from the transducer $TR_i$.

The time $T_2$ of the arrival of the echo received on the second face of the transducer $Tr_i$ is detected by the threshold and zero-passage detector 142. The output Q 177 validates an input 201 of an AND gate 202 whose second input 203 is connected to the output 144 of the detector 142. The output of the AND gate 202 applies a count stop signal on an input 204 of the counter 170. The level reached by the counter corresponds to the time interval $\Delta T$ between the time $T_1$ and $T_2$.

The signal on the input 204 of the counter 170 also initiates a counter in the control logic 110 (input 206) which after a time q, produces the calculation of the gain corresponding to the echo 82 by the application of a signal from its output 270 to the OR gate 304 which controls the input in operation of the circuits 300 and 140. The gain value $G_2$ corresponding to this second echo is readjusted and stored in memory again at the corresponding address.

After the time $T_2+q$, an output 211 of the control logic 110, connected to the control input 184 of the buffer memory 182 by an OR gate 212, causes the loading into this memory of the value reached by the counter 170 at the end of the instant $T_2$ and the gain value $G_2$ stored in memory. These values are in turn recorded in the first in-first out memory 220 as soon as an availability signal appears on a line 223. The first in-first out memory 220 transmits the information to the telemetering circuit 230 in synchronism with the operation of the control logic 110.

The correspondence between the signals received on the surface and the firing of the transducers results from the order in which this information is extracted from the memory 220. It is thus necessary for the memory to be loaded by a word transmitted by the telemetering system even if, owing to an accidental event, the circuit 46, instead of detecting two successive echoes, detects only one or none at all. For this purpose, two D-type flip-flops 240 and 241 connected in series are provided at the output 144 of the threshold and zero-passage detector 142. Their output Q is looped back with their input D. The clock CK input 242 of the flip-flop 240 is connected to the output 144. The output Q 244 of the flip-flop 240 is connected to the clock input C 245 of the flip-flop 241. If no echo has been detected following the firing of a transducer, the outputs Q 244 and Q 246 of the two flip-flops 240 and 241 both remain at zero. If only only one echo has been received, only the output Q 244 is in the 1 state. If two echoes have been received, only the output Q 246 is in the 1 state.

The control logic receives the signals from the outputs Q 244 and Q 246 of the flip-flops 240 and 241. At the end of the operating cycle of this logic relative to one of the transducers $TR_i$, the logic is programmed to check that two pulses have been received. If these outputs indicate that only one pulse has been received, this logic 110 causes the resetting of the buffer 182 through an input 213 and the immediate loading of a zero word from this register into the first in-first out register 220 by the control of a transfer input 221 of this register.

If the condition of the outputs 244 and 246 indicates that no echo has been received during the cycle following the firing of the transducer $TR_i$, the resetting of the buffer 182 by the input 213 is followed by two successive pulses on the input 221 for the successive entering of two zero words in the register 220.

In order to allow precise detection of the times $T_1$ and $T_2$, it is important that the respective echoes do not overlap. The value of the offcentering e of the transducer in relation to the axis of the sonde is thus selected according to the maximum duration of echoes such as 81 and 82. In addition, it takes into account the tolerance on the centering of the second 10 in the well; the centering defect can reach values which are not necessarily negligible, for example in inclined or deviated wells. In fact, a sufficient centering defect could bring the longitudinal axis of the transducer 42 sufficiently near the axis of the well so that the echoes 81 and 82 overlap with respect to time, thereby making the detection of the $T_2$ impossible. In practice, with the indicated offcentering value of 12.5 millimeters, it is possible to obtain satisfactory results with tolerances of 5 millimeters and even 8 millimeters on the centering defect of the tool. Known centralizers for a tool of relatively small dimensions, such as the one described, make it possible to keep the tool centering defects within these limits.

The value of the offcentering e also intervenes on the minimum diameter of the casings which can be measured by means of a sonde according to the invention. In fact, each pulse transmitted by the transistor 42 is not followed by a single echo, but by a succession of echoes coming from successive reflections of the acoustic pulse transmitted between the wall and the transducer. Thus, the first echo 81 picked up from the nearest wall portion of the casing 50 is followed by a second echo 86 (FIG. 5a) whose amplitude is attenuated in relation to that of the echo 81 and which is separated from it by a time internal equal to the transit time of the acoustic waves between the transducer and said nearest wall. If the diameter of the casing 50 is sufficiently small, this time interval can become smaller than the time interval $\Delta T$, i.e. the second echo from the nearest point of the casing is received before the first echo from the farthest wall. With the values indicated for the offcentering, and in the fluids customarily encountered in production oil wells, this situation cannot occur with the smaller diameter casings encountered, namely 4.5 inches or 110 millimeters.

When the apparatus operates in casings of large diameter no problems relative to the overlapping of the echoes coming from the two walls are encountered. Of course, the acoustic signals undergo an attenuation which increases as the distance they travel increases. In practice, a sonde equipped with the transducers described makes it possible to obtain satisfactory measurements in casing diameters as large a $9\frac{5}{8}$ inches or 230 millimeters. The measurement of the timed intervals $T_1$, and $T_2-T_1$ contains information on the respective distances from each transducer 42 to the zones of the casing wall which are placed in front of the opposite faces of the transducer. When the sonde is suitably centered in relation to the axis of the casing, the sum of these distances makes it possile to deduce a measurement of the casing diameter according to the orientation axis of the opening 54 in which is located the transducer.

The reference module 44 makes it possible to obtain a measurement of the propagation velocity of the acoustic waves in the considered fluid and to correct the systematic errors on the measurement of the propagation time specific to the transducers. As seen earlier, it is triggered periodically by the control logic 110 and the measured count levels corresponding to the time intervals $T'_1$ and $T'_2-T'_1$ defining the reception of the echoes reflected by the reflectors 78 and 76. These values are transmitted by the telemetering circuit 230 to the surface installation where a measurement of the propagation velocity V can be obtained according to the relationship:

$$T'_2 = T'_1 = (X_2 - X_1)/V$$

Furthermore, if it is assumed that $\epsilon$ is the systematic error imposed on the propagation time of the acoustic wave by the transmit time in the transducer itself and notably in the quarter-wave plates 62 and 63, it is possible to measure this systematic error from a count of the time $T'_2$ separating the reception of the second echo corresponding to the largest distance $X_2$ according to the formula:

$$T'_2 = X_2/V + \epsilon$$

$\epsilon$ can vary, notably with the temperature, as a function of the corresponding variations of the transit time in the quarter-wave plates as a function of this parameter. Similarly, the deviation $\epsilon$ takes into account certain errors specific to the processing electronics and which affect the processing of the signals coming from all the transducers such as, for example, differences between the triggering of the count and the moment of firing.

The measurement $\epsilon$ thus makes it possible, for each measurement of the times $T_1$ and $T_2$ obtained on the surface from each of the transducers, to correct the corresponding distance measurement. The diameter D of the casing 50 can be deduced from the transit times $T_1$ and $T_2$ coming from a transducer $42_i$ by the relationship:

$$D = (T_1 + T_2)\frac{\Delta X_o}{\Delta T_o} + 2\frac{X_1 T_2 - T_1 X_2}{\Delta T_o} + d$$

in which $X_1$, $X_2$, $T'_1$, $T'_2$ have already been defined in relation with the reference transducer, d is the thickness of the reference transducer, $\Delta X_o$ is equal to $X_2 - X_1$ and $\Delta T_o$ is equal to $T'_2 - T'_1$.

The measurements of the gain $G_1$ and $G_2$ are transmitted to the surface by the telemetering device 230 along with the respective measurements of the intervals $T_1$ and $(T_2 = T_1)$ for each transducer. The gain information results directly from the measurement of the amplitude of the echoes successively detected after the firing of each transducer. This gain information is processed on the surface to provide indications on the degree of reflectivity of the inner wall of the casing explored and hence its surface condition. The gain values retransmitted on the surface for the reference transducer 75 also provide an indication of the attenuation affecting the waves owing to the propagation in the fluid in which the tool is immersed, making it possible to calibrate the measurements provided by $G_1$ and $G_2$.

According to the indication of the relative position of the transducer on the sonde, which accompanies the corresponding measurements, the surface processing unit carries out a recalibration of the measurements received on a single depth scale according to the longitudinal position of the transducer 42 along the sonde.

In the case where each of the nine transducers 42 of the module 40 delivers two time indications corresponding to measurements of distances to the casing wall, the measurement processing unit 28 on the surface makes it possible to record, for the depth level corresponding to each group of measurements, a respective diameter value which can be displayed by any suitable menas, for example in the form of a graphic recording, with or without the processing of the nine successive diameter measurements coming from the nine transducers 42 during a firing cycle. Intermediate processing also makes it possible to show, as a function of depth, values of minimum, maximum and average diameters. Finally, visual information can also be obtained if required from the information provided by the automatic gain control circuit.

As an example, with a sonde 10 raised in the well at a speed of 30 centimeters/second and a successive firing frequency of 500 pulses/second, which corresponds to the excitation of a transducer every 2 milliseconds, the nine diameter measurements are obtained on a depth interval of 6 millimeters, with the possibility of further reducing this interval by decreasing the speed of the tool when passing a zone of particular interest.

The sonde thus defined hence makes it possible to obtain a high density of transverse dimension measurements over the entire periphery of the casing, with a resolution of one-tenth of a millimeter corresponding to a clock frequency of 10 MHz, giving an accuracy of about three-tenths of a millimeter on each measurement.

The measurements obtained are very localized and have the advantage of eing performable by means of a tool of very small diameter not requiring any contact with the well walls for the measurement, unlike the mechanical tools which generally involve a risk of scratching the tubes being checked.

The apparatus just described also offers the advantage of providing measurements of practical value even in the case where the diameter of the explored hole is too small to allow satisfactory receipt of the echo from the farthest wall owing to the double reflections on the closest wall. Such is notably the case with a tool of the type described when it is wished to use it for an internal verification not of the casing but of the production tubing itself. By carrying out the measurement of the transit time corresponding to the reception of the first pulse (time $T_1$) following each firing of a transducer, nine "radius" measurements are in fact obtained which are distributed regularly around the axis of the production tubing for each firing cycle. These nine measurements are carried out within a small diameter with the excellent accuracy furnished by the apparatus. They represent a considerable amount of information on the internal condition of this tubing thanks to which it is possible to avoid or to delay surface inspection, requiring the raising and individual dismantling of each tubing element.

In this regard, the choice of an odd number of transducers is favorable because it makes it possible to obtain measurements on radii distributed regularly around the casing or the production tubing, even when each transducer provides only one radius measurement.

With an odd number $2p+1$ of transducers, it is in fact possible to obtain a satisfactory estimate of the second radius measurement (not accessible directly) for a given transducer of row i from the radii furnished by the two tranducers of respective rows $i+p$ mod $(2p+1)$ and $i+p+1$ mod $(2p+1)$. For this, it is sufficient to calculate the average of these two radii and to add the distance related to the offcentering of the transducers.

Figure 10:
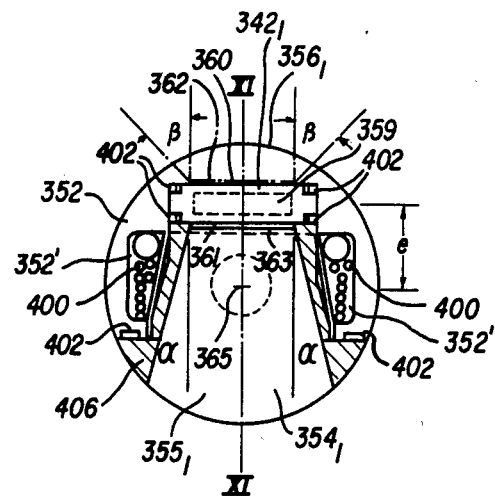
FIG. 10 is a sectional view of a second embodiment of the tool taken perpendicular to the axis of the sound.

FIG. 10 shows in cross-sectional view similar to FIG. 3 a portion of a second preferred embodiment of the module 40. Except as described below, the second embodiment is identical to the embodiment described above. The cross-section is taken at the level of a transducer $342_1$ of the sonde 10. A sonde body 352 is traversed completely by a passage $354_1$, which is higher than it is wide. Passage $354_1$ has outwardly opening walls which lead to two diametrically opposite ports $355_1$ and $356_1$ in the outer wall of the tool body 352. These walls angle outwardly (as illustrated) from the transducer toward port $355_1$ at an angle $\alpha$ relative to diameterical line XI—XI of FIG. 10 and at angle $\gamma$ relative to transverse line X—X of FIG. 11. Similarly the walls angle outwardly from the transducer toward part $356_1$ at an angle $\beta$ relative to line XI—XI and at an angle $\delta$ relative to line X—X. Transducer $342_1$ (identical in construction to transducer $42_1$ described above) is mounted in passage $354_1$ and has metallic coatings on its faces 360,361 covered with epoxy resin coatings 362,363. The plane of ceramic block 359 is parallel to the longitudinal axis 365 of the sonde body and perpendicular to the direction of passage $354_1$. Transducer $342_1$ is offcentered from axis 365 by a distance e, and is retained in the sonde body 352 by a cap member 406 which defines the walls of passage $354_1$ leading to port $355_1$. Seals 402 isolate cavities 352' from well fluids. Cavities 352' communicate with longitudinal bores 405 to provide a passage for conductors 400 connecting transducer $342_1$ (and other transducers $342_i$) to the electronic cartridge.

Figure 11:
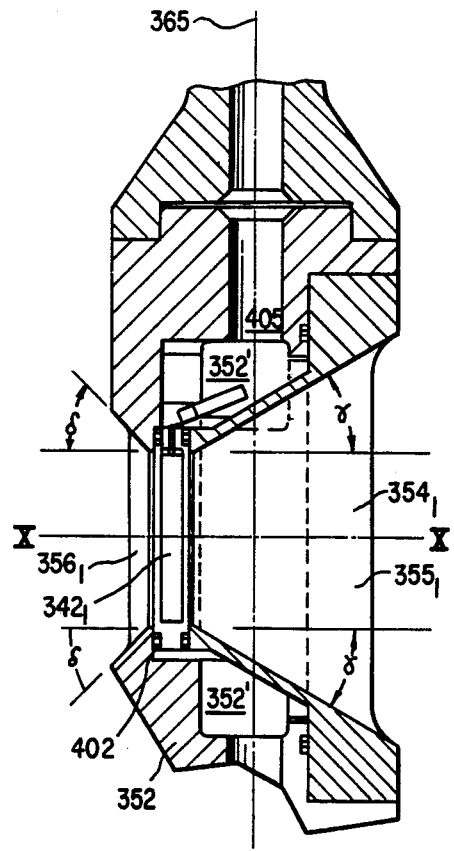
FIG. 11 is a partial sectional view of the second embodiment taken along XI—XI of FIG. 10.

The walls of passage $354_1$ leading to ports $355_1$ and $356_1$ are angled outwardly from the transducer $342_1$ in order to minimize noise in the received signals which can result from such effects as acoustic waves travelling along the wall surfaces, and reflections and diffractions occurring at the wall surfaces. Such noise occurs relatively early in the received signal and can be distinguished from the desired casing reflection signal when the casing is of relatively large diameter. However, in tubings of internal diameter only slightly larger than the tool diameter (for example, well production tubing) such noise may interfere with accurate detection of the tubing wall reflection signal. Since it is desired to have a tool which is capable of detecting transverse dimensions of the casing 12 as well as of the production tubing 16 in a well (FIG. 1), the tool construction as shown in FIGS. 10 and 11 is preferred. The angles $\alpha$, $\beta$, $\gamma$ and $\delta$ are made as large as possible, keeping in mind that the sonde body 352 must have rigidity and strength in spite of its small diameter. By way of non-limiting example, angles $\beta$ and $\delta$ may each be 45°, and angles $\alpha$ and $\gamma$ may be 14° and 30°, respectively.

Figure 12:
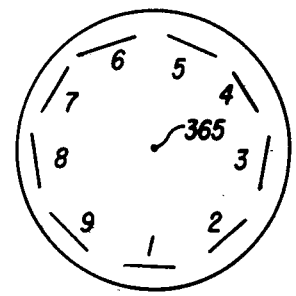
FIG. 12 is a schematic representation of the arrangement of the transducer assemblies within the second embodiment.

Since the angled walls of passage 354, require greater length in the direction of the tool axis than the rectangular walls of passage $54_1$ (FIGS. 3-4), it is preferred to arrange a plurality of transducers $342_i$ in other than a helical pattern along the sonde body. For example, if 9 transducers are to be disposed at 40° angles about the tool axis as shown schematically in FIG. 12, it is preferred that the sequence of transducers from top to bottom of the tool be 1,6,2,7,3,8,4,9,5. Thus, transducers which are adjacent one another in the direction of axis 365 are spaced 160° from each other about axis 365. This permits the transducer assemblies (and the walls of their respective passages $354_i$) to be "nested" together, reducing the overall length and allowing greater rigidity of the sonde body. It will be apparaent that the second preferred embodiment of module 40 described with reference to FIGS. 10-12 may be employed with the measurement circuits of FIGS. 7 and 8.

We claim:

1. Method for measuring the transverse dimensions of a well, comprising the steps of moving a sonde through the hole, simultaneously transmitting sonic energy toward two diametrically opposed sectors of the wall of the well from a single transducer within the sonde, said transducer being positioned at an offset position with respect to the longitudinal axis of the sonde, detecting by means of said transducer at least the first echo retransmitted by said two diametrically opposed sectors of the wall, obtaining from the time elapsed between the transmission and the detection of the sonic energy an indication of the transverse dimension of the well in the direction of the sonic energy transmission and including measuring the propagation rate of the acoustic waves in the medium surrounding said transducer by positioning a reference transducer and two reflectors at different distances from the reference transducer on the sonde, and by measuring the time elapsing between the transmission of a pulse from the reference transducer and the reception of the echo from the reflectors.

2. Apparatus for measuring the transverse dimensions of a well, including a sonde adapted for longitudinal displacement through the well at least one acoustic transducer supported in the sonde and capable of simultaneously transmitting directional sonic energy in two opposite directions radially of the sonde so as to direct energy to diametrically opposed sectors of the wall of the well and of detecting the echoes reflected from said sectors, said transducer being supported in an offset location with respect to the longitudinal axis of the sonde and further comprising a reference transducer mounted within the sonde and a first and second acoustic signal reflector positioned on each side of said reference transducer and at different distances from said reference transducer, said reflectors reflecting toward said reference transducer the resulting echoes in response to each pulse transmitted by it, the space between said reference transducer and each of said reflectors being in communication with the surroundings of the sonde.

3. The apparatus according to claim 2, wherein said reference transducer and said first and second reflectors are aligned in a longitudinal direction on said sonde.

* * * * *